(12) United States Patent
Benner et al.

(10) Patent No.: US 7,099,528 B2
(45) Date of Patent: Aug. 29, 2006

(54) METHODS AND DEVICES FOR COUPLING ELECTROMAGNETIC RADIATION USING DIFFRACTIVE OPTICAL ELEMENTS

(75) Inventors: Alan F. Benner, Poughkeepsie, NY (US); Oluwafemi O. Ogunsola, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/752,987

(22) Filed: Jan. 7, 2004

(65) Prior Publication Data

US 2005/0147365 A1    Jul. 7, 2005

(51) Int. Cl.
*G02B 6/28*    (2006.01)
*G02B 6/26*    (2006.01)
*G02B 6/42*    (2006.01)

(52) U.S. Cl. ............... 385/24; 385/16; 385/17; 385/20; 385/31; 385/37; 385/39; 385/50

(58) Field of Classification Search ......... 385/15–18, 385/14, 20–24, 46–52, 31, 33–37, 93, 11, 385/27–29, 88–92, 120; 350/96.16–96.19; 359/14–15, 566, 569–576

See application file for complete search history.

(56) References Cited

U.S. PATENT DOCUMENTS

| | | | | |
|---|---|---|---|---|
| 4,257,673 A | * | 3/1981 | Matthijsse | 385/37 |
| 4,516,832 A | * | 5/1985 | Jain et al. | 385/121 |
| 4,705,344 A | * | 11/1987 | Hinton et al. | 359/15 |
| 4,834,485 A | * | 5/1989 | Lee | 398/138 |
| 4,904,042 A | | 2/1990 | Dragone | 350/96.16 |
| 4,907,851 A | | 3/1990 | Marhic | 350/96.19 |
| 4,940,306 A | | 7/1990 | Kitayama et al. | 350/96.16 |
| 5,019,301 A | * | 5/1991 | Coden et al. | 264/1.25 |
| 5,043,975 A | * | 8/1991 | McMahon | 398/58 |
| 5,054,884 A | * | 10/1991 | Kubota | 359/566 |

(Continued)

FOREIGN PATENT DOCUMENTS

EP    0340987 A2    11/1999

(Continued)

OTHER PUBLICATIONS

"Diffracting Light", OE Magazine, The Monthly Publication of SPIE—The International Society for Optical Engineering, May 2001, pp. 1-5, http://oemagazine.com/fromTheMagazine/may01.tutorial.html.

(Continued)

*Primary Examiner*—Brian Healy
*Assistant Examiner*—Ryan Lepisto
(74) *Attorney, Agent, or Firm*—Eugene I. Shkurko, Esq.; John Pietrangelo; Heslin Rothenberg Farley & Mesiti, P.C.

(57) ABSTRACT

Diffractive optical elements are used in methods and devices for coupling or distributing electromagnetic radiation. The diffractive optical elements may be adapted to split one or more streams of radiation into multiple streams of radiation or to combine multiple streams of radiation to produce single streams. A plurality of diffractive optical elements may be fabricated on substrates by lithographic or molding methods. Diffractive optical elements that split one or more streams of radiation can be combined with diffractive optical elements that combine multiple streams of radiation to provide a coupling device, for example, a star coupler. The star coupler may be used in networked optical communication systems to provide multiple coupling between a plurality of optical drivers and a plurality of optical receivers. Aspects can be applied to any type of electromagnetic radiation having a wavelength that can be used as a medium for transferring information.

36 Claims, 8 Drawing Sheets

U.S. PATENT DOCUMENTS

| | | | |
|---|---|---|---|
| 5,071,232 A * | 12/1991 | Kato et al. | 359/315 |
| 5,136,671 A | 8/1992 | Dragone | 385/46 |
| 5,179,605 A * | 1/1993 | Kaverhad et al. | 385/37 |
| 5,208,692 A * | 5/1993 | McMahon | 398/48 |
| 5,228,103 A * | 7/1993 | Chen et al. | 385/14 |
| 5,377,287 A * | 12/1994 | Lee et al. | 385/35 |
| 5,408,553 A | 4/1995 | English, Jr. et al. | 385/36 |
| 5,412,506 A * | 5/1995 | Feldblum et al. | 359/569 |
| 5,434,434 A * | 7/1995 | Kasahara et al. | 257/84 |
| 5,452,382 A * | 9/1995 | Shionoya et al. | 385/11 |
| 5,469,277 A * | 11/1995 | Kavehrad et al. | 359/15 |
| 5,469,518 A * | 11/1995 | Song et al. | 385/89 |
| 5,537,252 A * | 7/1996 | Rauch | 359/569 |
| 5,566,024 A * | 10/1996 | Rauch | 359/571 |
| 5,568,574 A * | 10/1996 | Tanguay et al. | 385/14 |
| 5,726,786 A * | 3/1998 | Heflinger | 398/128 |
| 5,761,234 A * | 6/1998 | Craig et al. | 372/75 |
| 5,852,699 A * | 12/1998 | Lissotschenko et al. | 385/115 |
| 5,857,042 A * | 1/1999 | Robertson et al. | 385/33 |
| 5,915,054 A * | 6/1999 | Ota | 385/46 |
| 5,982,554 A * | 11/1999 | Goldstein et al. | 359/629 |
| 5,982,962 A * | 11/1999 | Koops et al. | 385/37 |
| 6,021,243 A | 2/2000 | Fasanella et al. | 385/46 |
| 6,236,780 B1 * | 5/2001 | Wade | 385/37 |
| 6,263,127 B1 * | 7/2001 | Dragone et al. | 385/24 |
| 6,304,694 B1 * | 10/2001 | Ford | 385/33 |
| 6,381,072 B1 * | 4/2002 | Burger | 359/622 |
| 6,385,364 B1 * | 5/2002 | Abushagur | 385/16 |
| 6,399,936 B1 * | 6/2002 | Hang et al. | 250/216 |
| 6,400,513 B1 * | 6/2002 | Southwell | 359/641 |
| 6,516,103 B1 * | 2/2003 | Palese | 385/5 |
| 6,531,767 B1 * | 3/2003 | Shrauger | 257/678 |
| 6,549,700 B1 * | 4/2003 | Sweatt et al. | 385/25 |
| 6,560,020 B1 * | 5/2003 | Kramer | 359/569 |
| 6,563,982 B1 * | 5/2003 | Xie et al. | 385/33 |
| 6,687,428 B1 * | 2/2004 | Huber et al. | 385/17 |
| 6,690,851 B1 * | 2/2004 | Guilfoyle | 385/18 |
| 6,859,574 B1 * | 2/2005 | Doerr et al. | 385/17 |
| 6,862,383 B1 * | 3/2005 | Kikuchi et al. | 385/33 |
| 2002/0067880 A1 * | 6/2002 | Huber et al. | 385/17 |
| 2002/0076162 A1 * | 6/2002 | Crafts | 385/49 |
| 2002/0131681 A1 * | 9/2002 | Castracane | 385/18 |
| 2002/0164114 A1 * | 11/2002 | Golub et al. | 385/18 |
| 2002/0191887 A1 * | 12/2002 | Bidnyk | 385/15 |
| 2003/0185484 A1 * | 10/2003 | Chakravorty et al. | 385/14 |
| 2003/0222070 A1 * | 12/2003 | Deveau et al. | 219/385 |
| 2004/0165822 A1 * | 8/2004 | Kobayashi et al. | 385/33 |

FOREIGN PATENT DOCUMENTS

GB    2228799 A    9/1990

OTHER PUBLICATIONS

"Facts About Fiber", OE Magazine, The Monthly Publication of SPIE—The International Society for Optical Engineering, Jun. 2001, pp. 1-5, http://oemagazine.com/fromTheMagazine/jun01.tutorial.html.

"LASER 2003: Diffractive optics aids design", LASER 2003. World of Photonics Visitor Magazine, Jun. 2003, pp. 1-3, http://optics.org/articles/feature/8/6/3/1.

M. R. Taghizadeh, et al., "Design and Fabrication of Diffractive Optical Elements", Microelectronic Engineering, vol. 34, pp. 219-242, Dec. 1997.

Stephen R. Quake, et al., "From Micro—to Nanofabrication with Soft Materials", Science, vol. 290, pp. 1536-1540, Nov. 2000.

J.-H. Ha, et al., "A New Token-Based Channel Access Protocol for Wavelength Division Multiplexed Multiprocessor Interconnects", Journal of Parallel and Distributed Computing, vol. 60, pp. 169-188, 2000.

* cited by examiner

METHODS AND DEVICES FOR COUPLING ELECTROMAGNETIC RADIATION USING DIFFRACTIVE OPTICAL ELEMENTS

TECHNICAL FIELD

This invention relates in general to devices and methods for coupling electromagnetic radiation, that is, devices and methods for simultaneously transmitting optical signals from one set of sources to another set of receivers, for example, for use as optical star couplers and optical communications systems comprising diffractive optical elements.

BACKGROUND OF THE INVENTION

For the purpose of chip-to-chip, board-to-board, and system-to-system communications over high bandwidth distance links, the use of optical interconnection networks as replacements for their electrical counterparts is steadily growing. For links of high bit rate and distance (for example, greater than 10 meter-gigabits per second), optical transmission technology is increasingly providing better cost and performance versus electrical transmission technology. An additional advantage of optical transmission technology is that it can provide multi-point links without significant reduction in performance.

Multi-drop and multi-point links are particularly useful in computer and communications systems with many integrated processing units, such as for Symmetric Multi-processor (SMP) buses, memory buses, and I/O buses in high-end systems, since such links allow close coupling between multiple different devices without multiple separate point-to-point links. For example, the "broadcast-and-snoop" protocols used for assuring coherence between processor caches could be most effectively implemented over a parallel bus of many multi-point links, if they could be made to operate at sufficiently high bit rate. High frequency electrical signaling limitations limit practical operation of multi-point links to a bit rate of roughly 500 Megabits/sec, which is increasingly insufficient for modem computer systems, so implementation of the broadcast functionality is typically implemented with a cascaded network of point-to-point links, greatly increasing system cost, complexity, and power consumption.

In the prior art, the optical equivalent for the multi-point link is an "optical star coupler". In an optical star coupler, optical data streams from each of the inputs are combined in the star coupler and physically distributed to all of the outputs, so that each input can (with appropriate arbitration for access) broadcast data to all of the outputs. These optical star coupler networks are created through the careful integration of devices that perform functions such as beam-splitting, "fan-in", "fan-out", and coupling. Optical star couplers are common components in the area of optical interconnection networks for transmitting each of multiple input signals to all of multiple destinations, thus connecting each of N inputs to all of N outputs simultaneously, N is an integer greater than zero.

Prior art star couplers are characterized by numerous disadvantages that make prior art star couplers unsatisfactory for use in computer broadcast bus interconnection networks. For example, prior art star couplers exhibit limited efficiency in coupling the input and output waveguides; exhibit limited efficiency in distributing input power from the input to the output waveguides; are not readily scalable for more complex applications; and are limited to a single-plane geometry. Most particularly, prior art star couplers do not allow integrated construction of multiple independent star coupler functions for multiple independent sets of links, as is required for multi-link computer bus interconnection networks.

SUMMARY OF THE INVENTION

Aspects of the present invention provide a novel approach to implementing an optical star coupler that overcomes the disadvantages of the prior art. According to certain aspects, the present invention provides an integrated construction of multiple star couplers having diffractive optical elements (DOEs) operating in parallel with each other to provide multi-point busing capability for a wide bus (that is, multiple lines wide). In contrast, prior art optical star coupler designs are typically limited to providing coupling function for single-line, serial links.

Aspects of the present invention include a device for coupling an optical signal from at least one optical driver to a plurality of optical receivers, the device including at least one diffractive optical element adapted for splitting the at least one optical signal into a plurality of optical signals and directing the plurality of optical signals to the plurality of optical receivers.

Another aspect of the invention is a device for coupling a plurality of optical signals from a plurality of optical signal transmitters and combining the plurality of optical signals to provide at least one combined optical signal to an optical receiver, the device including at least one diffractive optical element adapted for receiving a plurality of optical signals and combining the plurality of optical signals into at least one combined optical signal and directing the at least one combined optical signal to the optical receiver.

A further aspect of the invention is a device for coupling a plurality of optical signals to a plurality of optical receivers, the device including at least one first diffractive optical element adapted for splitting at least some of the plurality of optical signals to produce a plurality of sets of optical signals, each set of optical signals comprising a plurality of split optical signals, and the diffractive optical element further adapted for directing the split optical signals to the plurality of optical receivers. In one aspect of the invention, the plurality of optical receivers may be a plurality of diffractive optical elements, waveguides, or photosensitive devices. In another aspect of the invention, the device further includes at least one second diffractive optical element adapted for receiving and combining at least some of the plurality of split optical signals to produce a plurality of combined optical signals and directing the plurality of combined optical signals to the plurality of optical receivers.

A still further aspect of the invention is a method of coupling a plurality of input optical signals from a plurality of optical signal drivers with a plurality of optical receivers, the method including employing at least one first diffractive optical element adapted for splitting at least some of the plurality of input optical signals to produce a plurality of sets of optical signals, each set of optical signals comprising a plurality of split optical signals, and the diffractive optical element further adapted for directing the split optical signals to the plurality of optical receivers. In one aspect of the invention, the method may also include employing at least one second diffractive optical element adapted for receiving and combining at least some of the plurality of split optical signals to produce a plurality of combined optical signals and directing the plurality of combined optical signals to the plurality of optical receivers.

Devices and methods corresponding to the above-summarized devices and methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
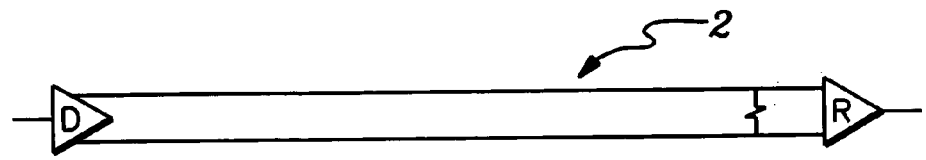
FIG. 1 depicts a schematic diagram of a point-to-point optical link according to the prior art.
Figure 2:
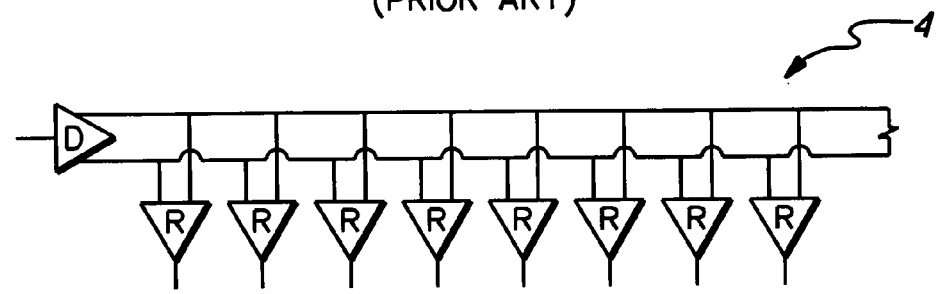
FIG. 2 depicts a schematic diagram of a multi-drop optical link having one driver and multiple receivers according to the prior art.
Figure 3:
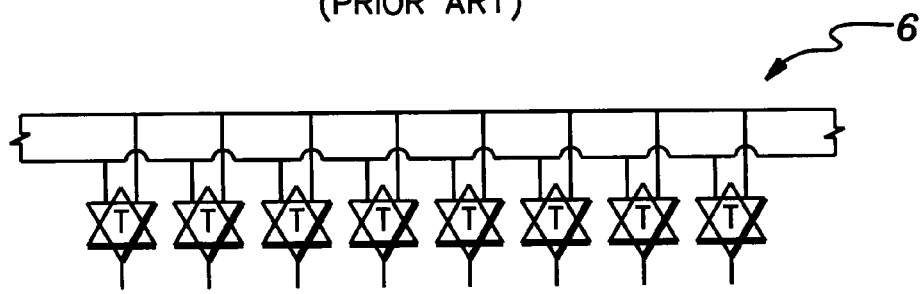
FIG. 3 depicts a schematic diagram of a multi-point optical link having multiple drivers and multiple receivers according to the prior art.
Figure 4:
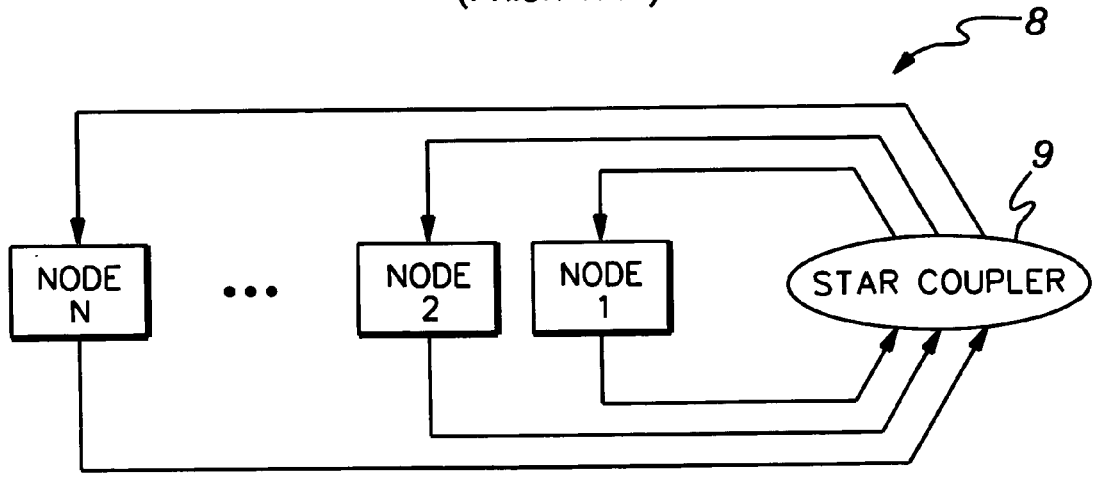
FIG. 4 depicts a schematic diagram of an optical system having an optical star coupler linking multiple nodes according to the prior art.

FIGS. 1, 2, 3, and 4 illustrate typical optical linkage systems according to the prior art. FIG. 1 is a schematic diagram of a point-to-point optical link system 2 between a single optical driver (D) and a single optical receiver (R). FIG. 2 is a schematic diagram of a multi-drop optical link system 4, according to the prior art having one driver (D) and multiple receivers (R). FIG. 3 is a schematic diagram of a multi-point optical link system 6 having multiple drivers and multiple receivers as indicated by transmitters (T) according to the prior art. FIG. 4 is a schematic diagram of a optical system 8 having an optical star coupler 9 linking multiple nodes in a computer network according to the prior art as proposed by J.-H. H a and T. M. Pinkston, in the *Journal of Parallel Distributive Computing*, vol. 60, 169–188, 2000. Aspects of the present invention make the system illustrated in FIG. 4 technically and economically feasible.

Figure 5:
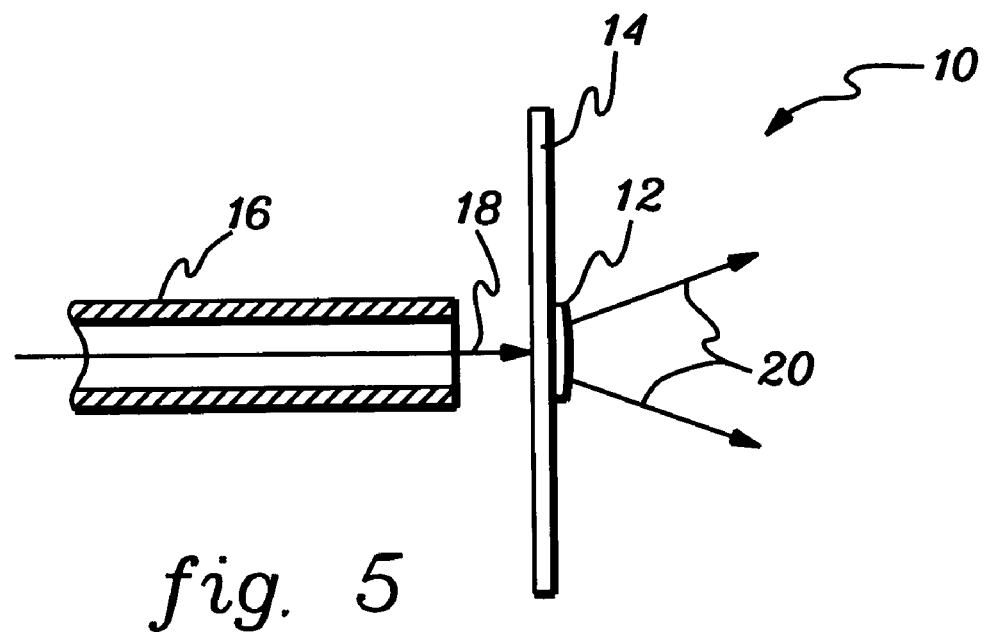
FIG. 5 depicts a schematic diagram of an optical splitter in accordance with one aspect of the present invention.
Figure 6:
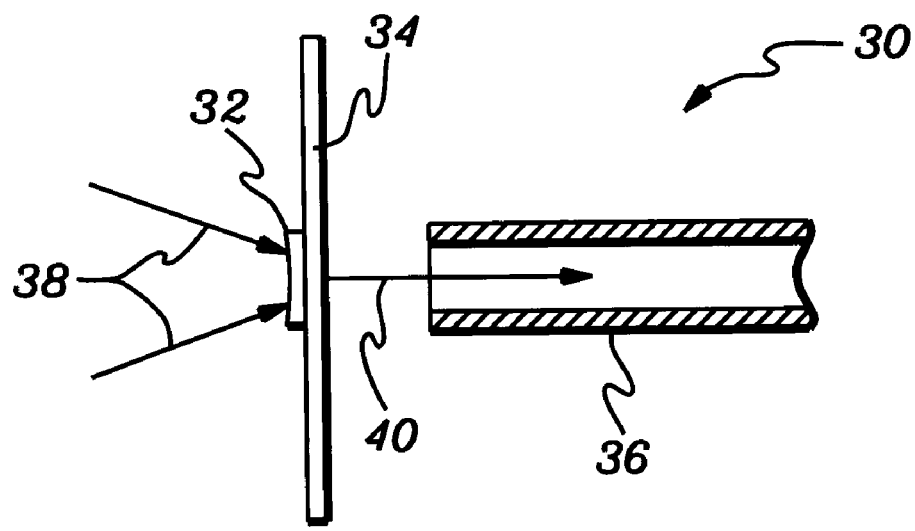
FIG. 6 depicts a schematic diagram of an optical combiner in accordance with one aspect of the present invention.

In the context of the present invention, the term "optical" may apply to any and all forms of electromagnetic radiation. However, in aspects of the present invention, the electromagnetic radiation typically comprises laser light, visible light, microwaves, radio waves, and x-ray, among other forms of radiation. The most general aspects of the present invention are illustrated in FIGS. 5 and 6. FIG. 5 shows a device 10 for splitting an optical beam from an optical driver (not shown) and directing the split beam to two or more optical receivers (not shown) according to one aspect of the present invention. In one aspect of the invention, device 10 allows the user to couple one or more optical driver with one or more optical receivers. In the context of the present invention, the terms "couple" and "coupling" refer to the transfer of energy, for example, electromagnetic radiation, from one medium (such as a waveguide or an optical fiber) to another medium, for example, to another like medium.

Device 10 comprises at least one diffractive optical element (DOE) 12 mounted on a substrate 14, for example, an optically transparent substrate. DOEs are computer-generated micro-optical components that use diffraction to manipulate light. DOEs are characterized by high efficiency, design flexibility, lightweight and small size. Typically, DOEs can be replicated at low cost for mass production. According to the known art, DOEs modify the wavefronts of a beam of radiation by segmenting the beam into a plurality of segmented beams and redirect the segmented beams through the use of interference and phase control. According to the present invention, DOE 12 may comprise a binary optic, a kinoform optic, a computer-generated holographic optic, or a diffraction grating. In the figures provided, DOE 12 and other DOEs are illustrated larger than their actual sizes to facilitate illustration. In the scale of the figures, in some aspects of the invention, DOE 12 and other DOEs may not be visible if they were drawn to scale.

According to the present invention, an optically transparent substrate may be any substrate that is substantially transparent to the electromagnetic radiation being transmitted through device 10 or through any other device disclosed herein. According to this aspect of the invention, DOE 12 is adapted to split the beam 18 into at least two beams 20 and direct beams 20 to at least two optical receivers (not shown). In one aspect of the invention, DOE 12 comprises a "fan-out" DOE. Device 10 may include at least one channel 16 which directs a beam of electromagnetic radiation 18, for example, laser light, through substrate 14 and onto DOE 12. The optical receivers may be any structure or device that is adapted to receive an optical stream, for example, another DOE, a photodetector, or another channel similar to channel 16, among other types of optical receivers. According to one aspect of the invention, the energy of beam 18 may be divided substantially equally among beams 20, though in one aspect of the invention the distribution of energy to beams 20 may be non-uniform. In one aspect of the invention, beam 18 may be collimated, for example, using a collimator (not shown), for instance, a collimating lens. The collimator may be integral with or positioned adjacent to DOE 12, for example, on the side of substrate 14 opposite the side on which DOE 12 is located.

In one aspect of the invention, DOE 12 comprises a DOE produced through the techniques of lithographic technology, for example, microlithography or nanolithography. DOE 12 may be fabricated by any form of conventional lithographic methods for producing a diffraction grating that is adapted to split a beam of electromagnetic radiation into at least two beams 20 of electromagnetic radiation, for example, the methods described by Taghizadeh, M. R. et. al. in "Design and Fabrication of Diffractive Optical Elements," Microelectronic Engineering, vol. 34, pg. 219–242, December 1997, the disclosure of which is incorporated by reference herein. In another aspect of the invention, DOE 12 may be fabricated by molding, for example, forming a deformable substrate, such as a thin plastic substrate, over a die having a desired contour to produce the desired diffracting pattern in or on the substrate, for example, the methods described by Stephen R. Quake and Axel Scherer in "From Micro- to Nanofabrication with Soft Materials," Science, vol. 290, pp. 1536–1540, November 2000, the disclosure of which is incorporated by reference herein. In one aspect of the invention, DOE 12 may be constructed having structures that control the relative intensities of the individual beams 20. For example, the profile of DOE 12 may be shaped such that all individual beams 20 have equal intensity, or such that the individual beams 20 have different intensities.

Channel 16 may be any channel that can transmit electromagnetic radiation to DOE 12. For example, in one aspect of the invention, channel 16 comprises at least one optical fiber. In another aspect of the invention, channel 16 comprises a bundle of optical fibers, for example, a bundle comprising 2 or more optical fibers, for example, 8 or more optical fibers, or 72 or more optical fibers. Though beam 18 is shown in FIG. 5 as passing through the center of channel 16, it is understood by those of skill in the art, that this is for illustrative purposes only; beam 18 may propagate through channel 16 by means of reflection, deflection, or diffraction. For example, in the case where channel 16 is an optical fiber, beam 18 may be transmitted through channel 16 by deflection off the inner surface of a core of optical fiber by total internal reflection. In the case where channel 16 is a hollow conduit or capillary, and beam 18 comprises an x-ray beam, beam 18 may be transmitted through channel 16 by means of total external reflection.

According to this aspect of the invention substrate 14 comprises a material, which is at least translucent to the electromagnetic radiation being transmitted by channel 16. In one aspect of the invention, substrate 14 is substantially transparent to the electromagnetic radiation being transmitted by channel 16. In one aspect of the invention, substrate 14 may comprise plastic, glass, or silicon.

FIG. 6 shows a device 30 for receiving at least two optical beams from one or more optical transmitters and directing the combined beam to one or more optical receivers according to another aspect of the present invention. Device 30 comprises at least one DOE 32 mounted on an optically transparent substrate 34. Device 30 may include a channel 36. According to this aspect of the invention, DOE 32 receives at least two beams of electromagnetic radiation 38, for example, laser light, and directs the two beams 38 into channel 36, as shown schematically as arrow 40, wherein the beams are transmitted down channel 36 to one or more optical receivers (not shown). The optical receiver may be another DOE, a photodetector, or another channel similar to channel 36, among other types of optical receivers. DOE 32 may be similar to DOE 12 discussed with respect to FIG. 5 and formed by similar lithographic or molding methods. In one aspect of the invention, DOE 32 comprises a "fan-in" DOE. Channel 36 may be similar to channel 16 discussed with respect to FIG. 5, for example, one or more optical fibers. Again, though beam 40 is shown in FIG. 6 as passing through the center of channel 36, it is understood by those of skill in the art, that this is for illustrative purposes only; beam 40 may propagate through channel 16 by means of reflection, deflection, or diffraction in a fashion similar to beam 18 shown in FIG. 5. In one aspect, of the invention, beam 40 may comprise a plurality of beams. Also, substrate 34 may be similar to substrate 14 discussed with respect to FIG. 5. In one aspect of the invention, beam 40 may be collimated, for example, using a collimator (not shown). The collimator may be integral with or positioned adjacent to DOE 38.

When devices 10 and 30 are used to transmit electromagnetic radiation for communications purposes, for example, in an optical computer or optical phone lines, the radiation is typically transmitted by means of optical fiber in one of two modes: single-mode and multimode. These two modes are described by Dowdell in "Facts About Fiber—Optical fiber provides the underlying skeleton of a network, defining what it can and can't do", OE Magazine, June 2001, pp. 32+, the disclosure of which is incorporated by reference herein. According to aspects of the present invention, channels 16 and 36 comprise one or more optical fibers and the electromagnetic radiation transmitted through channels 16 and 36 may be transmitted in single-mode or multimode fashion. For example, in one aspect of the invention shown in FIG. 5, beam 18 comprises a single-mode transmission. In another aspect of the invention shown in FIG. 6, beam 40 comprises a multimode transmission.

Figure 7:
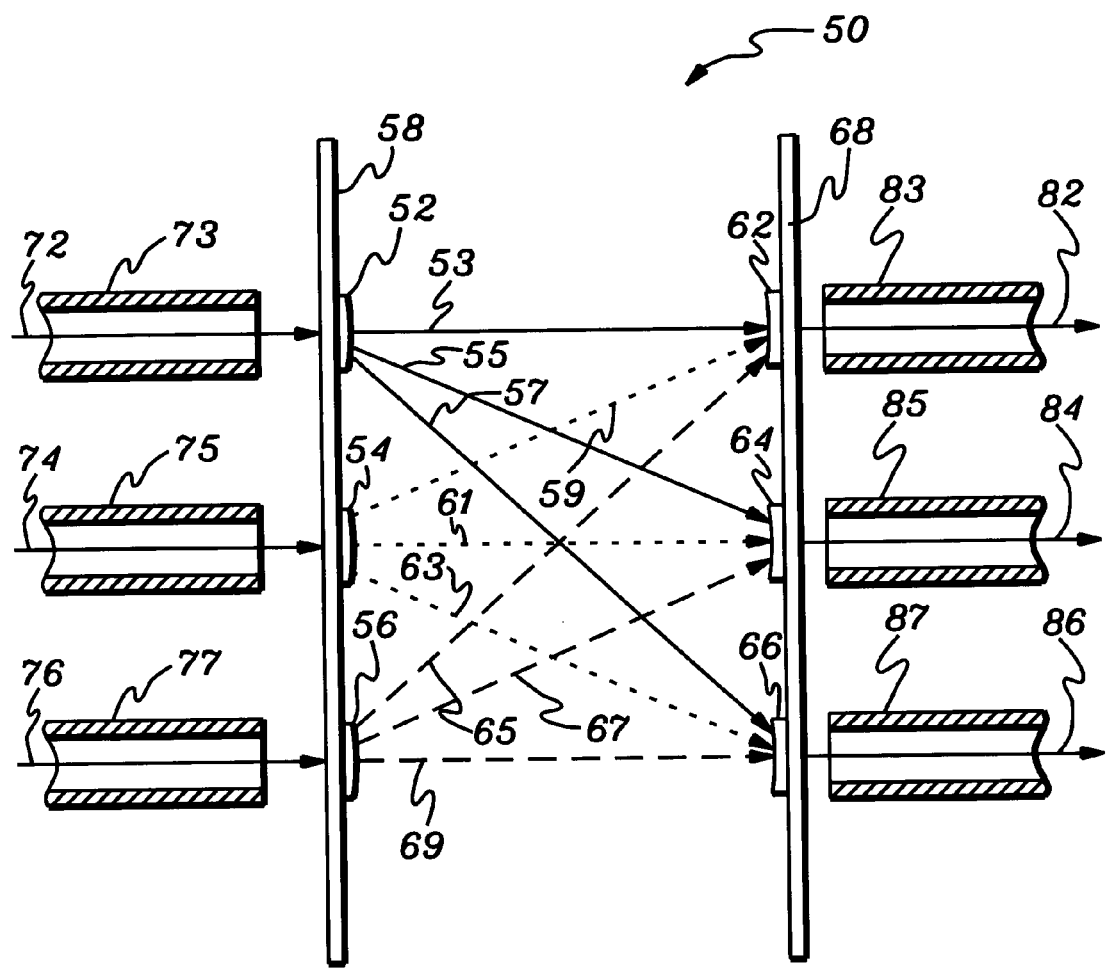
FIG. 7 depicts a schematic diagram of an optical coupler in accordance with one aspect of the present invention.

FIG. 7 illustrates another aspect of the present invention in which the features of the aspects shown in FIGS. 5 and 6 are combined to provide a device 50 for distributing a plurality of electromagnetic radiation beams to a plurality of electromagnetic radiation receivers. According to this aspect of the invention, device 50 comprises a plurality of DOEs 52, 54, and 56 each adapted to receive and split a beam of electromagnetic radiation into a plurality of beams of electromagnetic radiation and a plurality of DOEs 62, 64, and 66 each adapted to receive and redirect a plurality of beams of electromagnetic radiation toward an optical receiver, for example, by means of at least one channel. According to this aspect of the invention, device 50 may comprise at least two DOEs 53, 54, and may include at least two DOEs 62, 64, but many more similar DOEs may be used, for example, 16 DOEs or 32 DOEs or more, on the input and output sides of device 50. In addition, according to one aspect of the invention, the number of DOEs on one side of device 50 may be different, for example, less or more, than the number of DOEs on the other side of device 50. DOEs 52, 54, and 56 may be similar to and fabricated by the same methods as DOE 12 shown in and described with respect to FIG. 5. DOEs 62, 64, and 66 may be similar to and be fabricated by the same methods as DOE 32 shown in and described with respect to FIG. 6. DOEs 52, 54, and 56 and DOEs 62, 64, and 66 may be mounted on one or more substrates 58 and 68, respectively. One or more substrates 58 and 68 may be similar to substrates 14 and 34 shown in and described with respect to FIGS. 5 and 6. In one aspect of the invention, each individual DOE may be designed differently. In one aspect of the invention, DOEs 52, 54, and 56 and DOEs 62, 64, and 66 may be implemented on a single mask. For example, in one aspect, the same mask may be used to lithographically define both the input DOEs and the output DOEs.

According to the aspect of the invention shown in FIG. 7, DOEs 52, 54, and 56 receive at least one beam of electromagnetic radiation 72, 74, and 76, respectively, and split each of the beams 72, 74, and 76 into a plurality of split beams. For example, as shown in FIG. 7, beam 72 is received by DOE 52 and is split into a plurality of beams 53, 55, and 57. Similarly, beam 74 is received by DOE 54 and is split into a plurality of beams 59, 61, and 63, and beam 76 is received by DOE 56 and is split into a plurality of beams 65, 67, and 69. Though in FIG. 7 DOEs 52, 54, and 56 are shown splitting their respective beams into three split beams, according to one aspect of the present invention, DOEs 52, 54, and 56 may split their respective beams into at least two split beams. According to another aspect of the invention, DOEs 52, 54, and 56 may split their respective beams into at least four beams, for example, at least 16 beams, at least 32 beams, or 64 or more split beams.

The at least one beam of electromagnetic radiation 72, 74, and 76 may be provided by one or more optical drivers (not shown) and be transmitted to device 50 by means of one or more channels or wave-guides 73, 75, and 77. Channels 73, 75, and 77 may be similar to and have all the features of channel 16 shown in and described with respect to FIG. 5. For example, channels 73, 75, and 77 may comprise any channel adapted to transmit electromagnetic radiation. In one aspect of the invention, channels 73, 75, and 77 may comprise one or more optical fibers, for example, one or more bundles of optical fibers. In one aspect of the invention, channels 73, 75, and 77 may comprise one or more optical fibers that transmit radiation in single-mode or multimode fashion as described by Dowdell in the reference cited above. Again, though beams 72, 74, and 76 are shown in FIG. 7 as passing through the center of their respective channels, it is understood by those of skill in the art, that this is for illustrative purposes only. Beams 72, 74, and 76 may propagate through their respective channels in a fashion similar to beam 18 in FIG. 5, for example, by means of reflection, deflection, or diffraction.

According to this aspect of the invention DOEs 62, 64, and 66 receive a plurality of beams from received and split by DOEs 52, 54, and 56 and redirect the split beams to an optical receiver (not shown) as indicated by arrows 82, 84, and 86, respectfully. For example, in the aspect of the invention shown in FIG. 7, DOE 62 receives a split beam 53 from DOE 52, a split beam 59 from DOE 54, and a split beam 65 from DOE 56 and directs the split beams into one or more beams 82. Similarly, in the aspect of the invention shown in FIG. 7, DOE 64 receives a split beam 55 from DOE 52, a split beam 61 from DOE 54, and a split beam 67 from DOE 56 and directs the split beams into one or more beams 84; and DOE 66 receives a split beam 57 from DOE 52, a split beam 63 from DOE 54, and a split beam 69 from DOE 56 and directs the split beams into one or more beams 86. Again, DOEs 62, 64, and 66 may comprise at least two DOEs 62, 64, but many more similar DOEs may be used. Though DOEs 62, 64, and 66 are shown receiving and redirecting only three beams of electromagnetic radiation, in one aspect of the invention, at least two DOEs 62, 64 are adapted to receive at least two split beams form at least two DOEs 52, 54. Also, according to another aspect of the invention, DOEs 62, 64, and 66 may receive at least four split beams, for example, at least 16 split beams, at least 32 split beams, or 64 or more split beams.

The redirected beams 82, 84, and 86 may be transmitted to their respective optical receiver (again, not shown) by means of one or more channels 83, 85, and 87. Channels 83, 85, and 87 may be similar to and have all the features of channel 36 shown in and described with respect to FIG. 6. For example, channels 83, 85, and 87 may comprise any channel adapted to transmit electromagnetic radiation. In one aspect of the invention, channels 83, 85, and 87 may comprise one or more optical fibers, for example, one or more bundles of optical fibers. In one aspect of the invention, channels 83, 85, and 87 may comprise one or more optical fibers that transmit radiation in single-mode or multimode fashion as described by Dowdell in the reference cited above. Though beams 82, 84, and 86 are shown in FIG. 7 as passing through the center of their respective channels, it is understood by those of skill in the art, that this is for illustrative purposes only. Beams 82, 84, and 86 may propagate through their respective channels in a fashion similar to beam 40 in FIG. 6, for example, by means of reflection, deflection, or diffraction.

Though the DOEs illustrated in FIG. 7 are mounted on opposite parallel planes, aspects of the present invention are not limited to mounting DOEs in parallel planes. For example, in one aspect of the invention, the DOEs may be mounted in oblique planes, for example, DOEs 52, 54, and 56 may be mounted in a vertical plane as shown in FIG. 7, but DOEs 62, 64, and 66 may be mounted in oblique plane, that is, a plane which is non-vertical and not parallel to the plane of DOEs 52, 54, and 56. In this aspect of the invention, the design of DOEs 52, 54, and 56 and DOEs 62, 64, and 66 can be adapted to accommodate the relative positions and orientations of the respective DOEs to direct or receive the respective beams of electromagnetic radiation. In another aspect of the invention, the DOEs may be mounted in multiple oblique planes, for example, DOEs 52, 54, and 56 may be mounted in two or more oblique or non-parallel planes and DOEs 62, 64, and 66 may be mounted in two or more oblique or non-parallel planes. In one aspect of the invention, DOEs 52, 54, and 56 and DOEs 62, 64, and 66 may be mounted on one or more different inner surfaces of an enclosure. For example, in a square or rectangular enclosure, DOEs 52, 54, and 56 may be mounted on one or more inner surfaces of the square or rectangular enclosure and DOEs 62, 64, and 66 may be mounted on one or more different inner surfaces of the square or rectangular enclosure. In one aspect of the invention, the enclosure may be spherical or hemispherical, and DOEs 52, 54, and 56 may be mounted on one or more inner surfaces of the spherical or hemispherical enclosure and DOEs 62, 64, and 66 may be mounted on one or more other inner surfaces of the spherical or hemispherical enclosure. In another aspect of the invention, the path of the electromagnetic radiation beams may be varied by the use of one or more mirrors, lenses, or other radiation redirecting elements.

According to one aspect of the invention, DOEs 62, 64, and 66 and their substrate 68 are not necessary. In this aspect of the invention, device 50 comprises at least one DOE 52, 54, and 56 which transmits radiation directly to one or more optical receivers (not shown), for example, to one or more channels 83, one or more optical fibers, or to one or more photodetectors. In one aspect of the invention, photodetectors convert the optical signal into one or more electrical signals.

Figure 8:
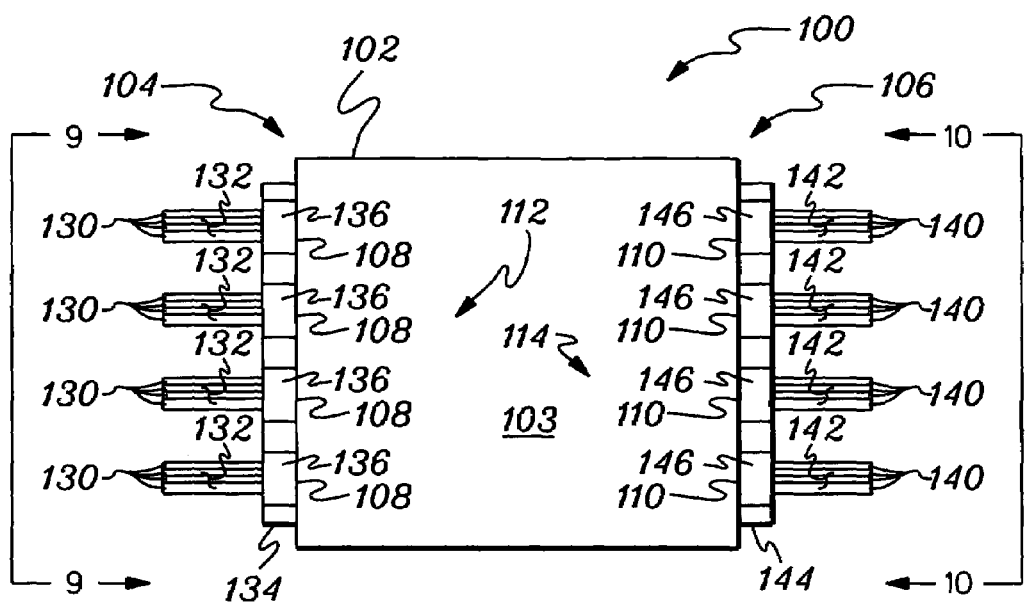
FIG. 8 depicts a front elevation view of a two-dimensional optical coupler in accordance with one aspect of the present invention.
Figure 9:
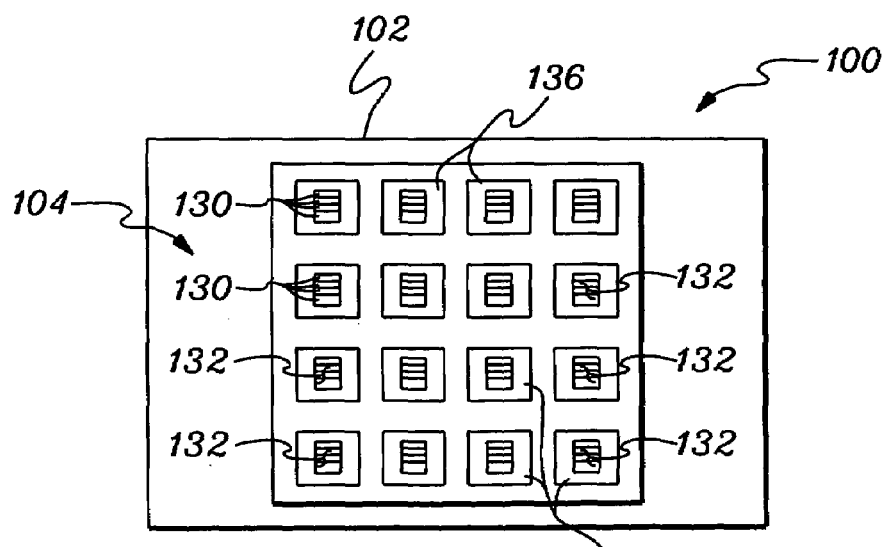
FIG. 9 depicts a side elevation view of the two-dimensional optical coupler illustrated in FIG. 8 showing the input end of the coupler as viewed along lines 9—9 in FIG. 8.
Figure 10:
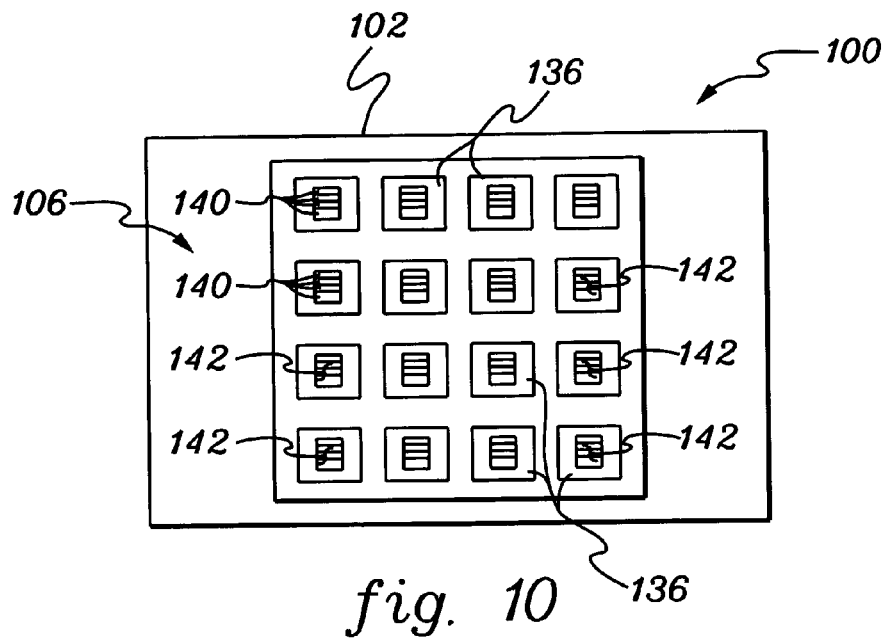
FIG. 10 depicts a side elevation view of the two-dimensional optical coupler illustrated in FIG. 8 showing the output end of the coupler as viewed along lines 10—10 in FIG. 8.
Figure 11:
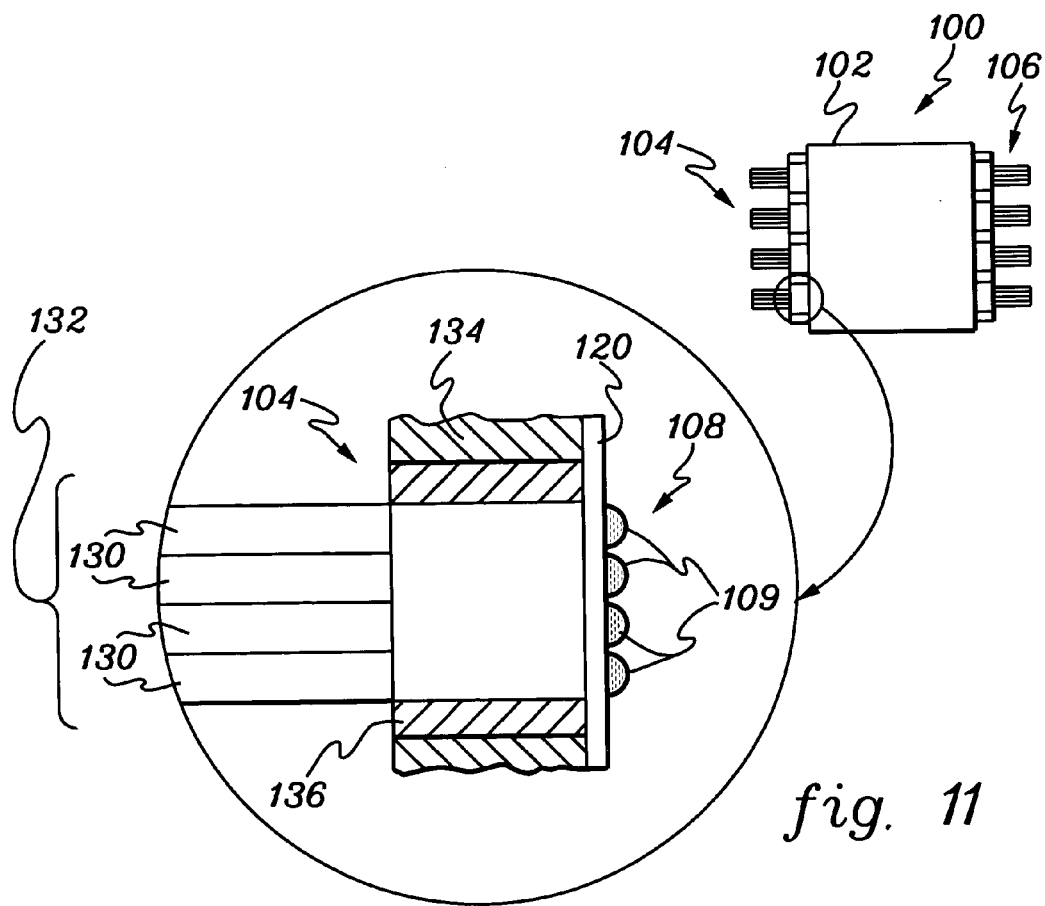
FIG. 11 depicts a detailed view of the arrangement of the diffractive optical elements on the input side of the two-dimensional optical coupler illustrated in FIG. 8.
Figure 12:
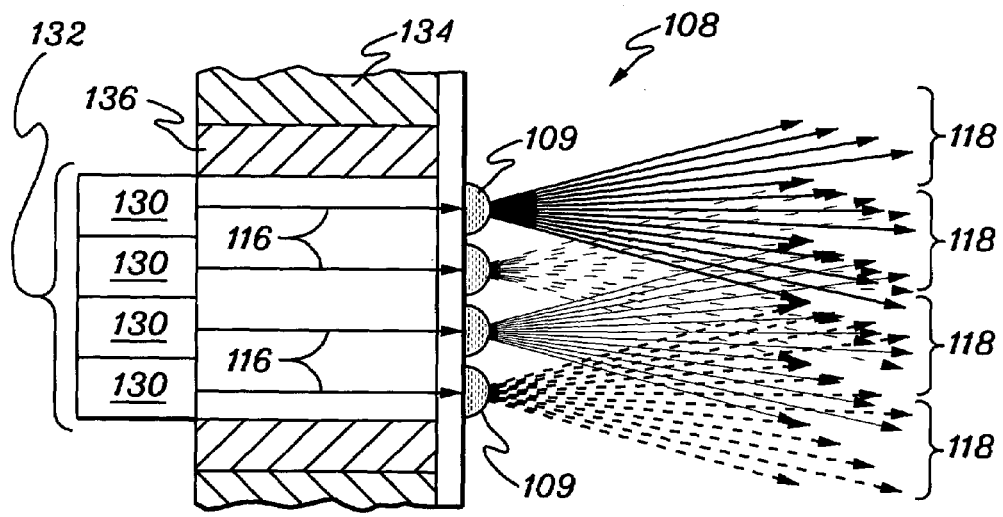
FIG. 12 depicts a schematic illustration of the radiation streams. for the detailed view shown in FIG. 11.
Figure 13:
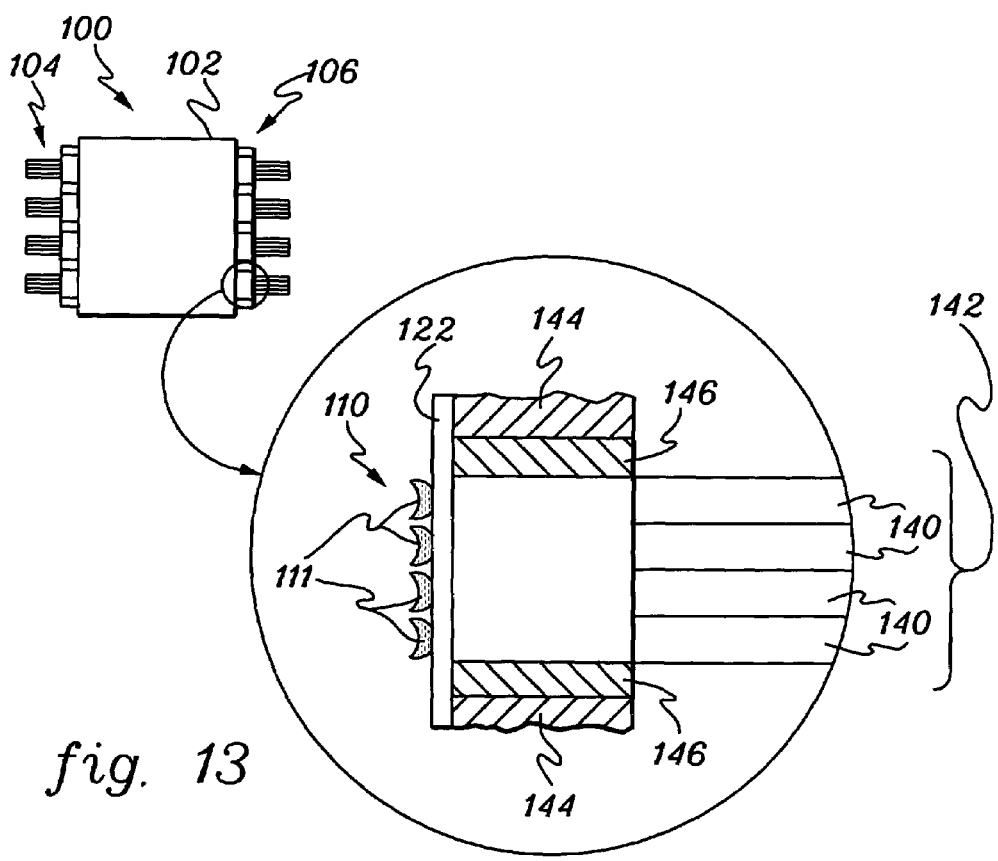
FIG. 13 depicts a detailed view of the arrangement of the diffractive optical elements on the output side of the two-dimensional optical coupler illustrated in FIG. 8.
Figure 14:
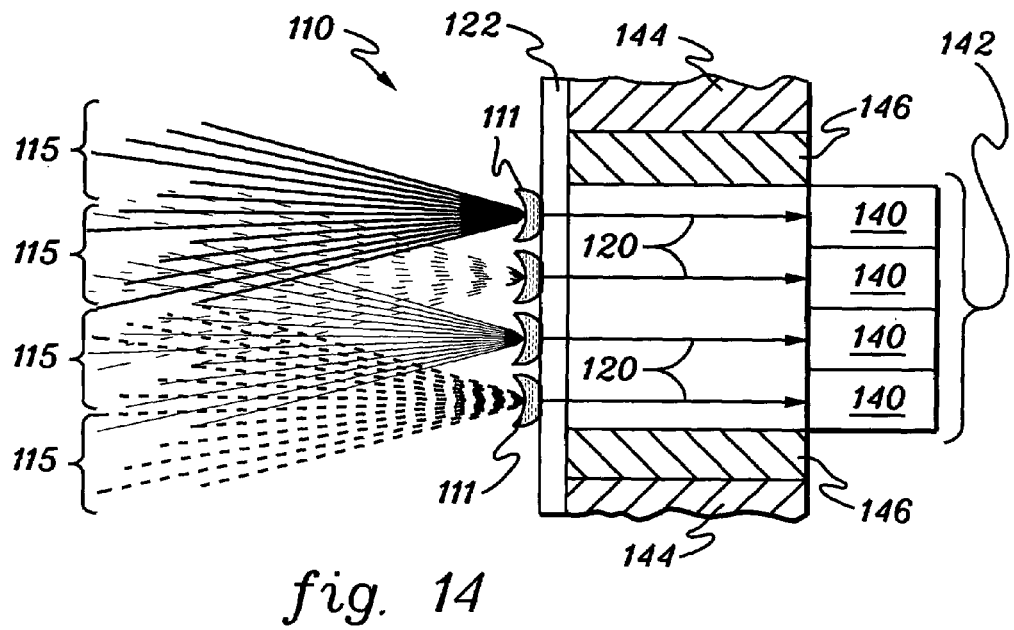
FIG. 14 depicts a schematic illustration of the radiation streams for the detailed view shown in FIG. 13.
Figure 15:
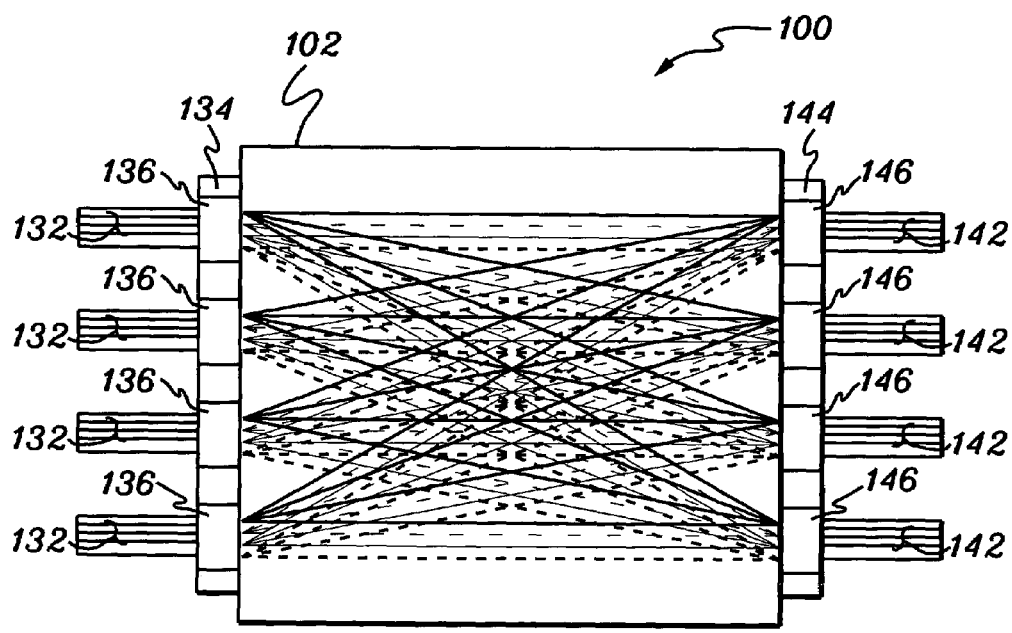
FIG. 15 depicts a schematic side illustration of the radiation streams for the aspect of the invention shown in FIG. 8.

FIGS. 8 through 15 illustrate a further aspect of the invention. FIG. 8 illustrates a side elevation view of a device 100 for distributing a plurality of electromagnetic radiation steams to a plurality of electromagnetic radiation receivers. Device 100 is an expansion or scaled-up version of device 50 shown in FIG. 7. Device 100 comprises a housing 102 having an input end 104 and an output end 106. Housing 102 typically encloses a region or void or coupling region 103 through which electromagnetic radiation may pass with little or no distortion or attenuation. For example, void 103 may be a gas-filled cavity, for example, containing air or gas, for instance an inert gas. In one aspect of the invention, void 103 may not be a void but comprise a solid or liquid which provides little or no distortion or attenuation to the radiation passing through it, for example, optical-quality glass. FIG. 9 illustrates a side elevation view of the input end 104 of device 100 as viewed along lines 9—9 in FIG. 8. FIG. 10 illustrates a side elevation view of the output end 106 of device 100 as viewed along lines 10—10 in FIG. 8. FIG. 11 depicts a detailed view of the arrangement of one set 108 of representative DOEs 109 mounted on input side 104 of device 100. FIG. 12 depicts a schematic illustration of the split radiation streams 118 split by each set 108 of DOEs 109 shown in FIG. 11. FIG. 13 depicts a detailed view of a representative set 110 of DOEs 111 mounted on output side 106 of device 100. FIG. 14 depicts a schematic illustration of the split radiation streams received by the representative set 110 of DOEs 111 shown in FIG. 13. FIG. 15 depicts a schematic side illustration of the radiation streams in device 100 for the aspect of the invention shown in FIG. 8.

As shown in FIG. 8, device 100 includes a first array 112 of sets 108 of DOEs 109 mounted in input end 104 of device 100. Though according to this aspect of the invention input end 104 includes a 4×4 array of sixteen (16) sets 108 of DOEs 109, for the sake of clarity of illustration, only four representative sets 108 of DOEs 109 are identified in the side elevation view shown in FIG. 8. As shown in FIG. 11, in this aspect of the invention, each set 108 includes four (4) DOEs 109. It will be readily apparent to those of skill in the art that the aspect of the invention shown in FIGS. 8–15 is just one aspect of the invention and that in other aspects of the invention device 100 may include at least two sets 108 arranged in a multitude of two-dimensional, that is, N×N arrays, where N is a positive integer. For example, a rectangular array, such as 1×2, 1×8, 2×12, or 3×4 among many others; or a square array, such as 2×2, 8×8, 32×32, or 72×72, among many others. In one aspect of the invention, the value of N is determined by the amount of signal splitting that can be done with adequate power margin for reliable signal transmission. The power margin is typically determined by, for example, the power of the source laser and receiver photodetector capabilities (not shown). With high-power telecommunications-grade lasers, and sensitive photodetectors, operating at 10 Gbit/sec, a splitting ratio of 1:64 is possible, based on link power budget margins. In one aspect of the invention, more cost-effective components can support lower signal splitting ratios.

Also, it will be readily apparent to those of skill in the art that each set 108 of DOEs may include one or more DOEs 109, for example, 2, 4, 8, or more DOEs 109 per set 108. Where K is the number of DOEs 109, in one aspect of the invention, the value of K may be determined by the alignment capability across the input optical fibers within a bundle of optical fibers. In one aspect of the invention, K can equal up to 72 fibers in a bundle, for example, for ferrule connectors in the "MT" family.

As shown in FIG. 12, according to this aspect of the invention, each DOE 109 is adapted to receive a beam of electromagnetic radiation 116 and split the beam 116 into a plurality of sets of split beams 118. Beams of electromagnetic radiation 116 may originate from an optical driver (not shown). DOEs 109 may be similar to and fabricated by similar methods as DOE 12 shown in and described with respect to FIG. 5 or DOEs 52, 54, and 56 shown in and described with respect to FIG. 7.

As also shown in FIG. 8, device 100 includes a second array 114 of sets 110 of DOEs 111 mounted on output end 106 of device 100. Again, though according to this aspect of the invention output end 106 includes a 4×4 array of sixteen (16) sets 110 of DOEs 111, for the sake of clarity of illustration, only four representative sets 110 of DOEs 111 are identified in FIG. 8. As shown in FIG. 14, in this aspect of the invention, each set 110 includes four (4) DOEs 111. Again, it will be readily apparent to those of skill in the art that the aspect of the invention shown in FIGS. 8–15 illustrates just one aspect of the invention and that in other aspects of the invention device 100 may include one or more sets 110 containing one or more DOEs 111, as described above with respect to the first array 112. As shown in FIG. 14, according to this aspect of the invention, each DOE 111 is adapted to receive a plurality of beams of electromagnetic radiation 115 and redirect the plurality of beams of radiation 115 toward an optical receiver (not shown), for example, as indicated by arrows 120. Optical receivers may comprise a radiation transmitting channel or a waveguide, or a photosensitive device such as a p-i-n or metal-semiconductor-metal photodetector, among other types of optical receivers. DOEs 111 may be similar to and fabricated by similar methods as DOE 32 shown in and described with respect to FIG. 6 or DOEs 62, 64, and 66 shown in and described with respect to FIG. 7.

In the aspect of the invention shown in FIGS. 8–15, each DOE 109 mounted on the input end 104 of device 100 is adapted to split each beam 116 (see FIG. 12) into sixteen (16) separate beams and direct each of the sixteen (16) beams to one of the DOEs 111 mounted on the output end 106 of device 100. For example, in the aspect of the invention used for an optical communication system using laser light as the form of electromagnetic radiation, each of the laser beams received on input end 104 of device 100 is distributed to each DOE 111 located on the output end 106 of device 106, for example, to effectively optically couple the sixty-four (64) input communication signals with sixty-four (64) output communication signals, that is, to provide an optical star coupler.

As shown in FIG. 11, each set 108 of DOEs 109 may be mounted on a substrate 120, for example, a substrate at least partially transparent, typically substantially totally transparent, to the electromagnetic radiation beams directed to DOEs 109. As shown in FIG. 13, each set 110 of DOEs 111 may be mounted on a substrate 122, for example, a substrate at least partially transparent, typically substantially totally transparent, to the electromagnetic radiation beams directed to DOEs 111. Substrates 120 and 122 may be similar to and made from the same material as substrate 14 shown in and described with respect to FIG. 5 or substrate 58 shown in and described with respect to FIG. 7. Substrates 120 and 122 may be a single substrate or a plurality of substrates. For example, each set 108 of DOEs 109 or each set 110 of DOEs 111 may be mounted on a single substrate 120, 122, respectively, or two or more sets 108 of DOEs 109 or two or more sets 110 of DOEs 111 may be mounted on separate substrates 120, 122, respectively.

As shown in FIGS. 8–15, device 100 may also include a plurality of electromagnetic radiation input channels or wave-guides 130 and a plurality of output channels or wave-guides 140. Channels 130 and 140 may be similar to and have all the features of channel 16 shown in and described with respect to FIG. 5 or channels 73, 75, and 77 shown in and described with respect to FIG. 7. For example, channels 130 and 140 may comprise any channel adapted to transmit electromagnetic radiation. In one aspect of the invention, channels 130 and 140 comprise optical fibers, for example, one or more optical fibers that transmit radiation in single-mode or multimode fashion as described by Dowdell in the reference cited above. As shown in FIGS. 8–15, channels 130 and 140 may be assembled into bundles 132, 142, respectively, of channels or wave-guides. For example, channels 130 and 140 may comprise bundles of optical fibers, each bundle including two or more optical fibers. In the aspect of the invention shown in FIGS. 8–15, bundles 132 and 142 include four (4) optical fibers, but may include more, for example, 8, 16, 32, 64, 72, 96 or more optical fibers in each bundle 132 or 142.

Figures 16, 17:
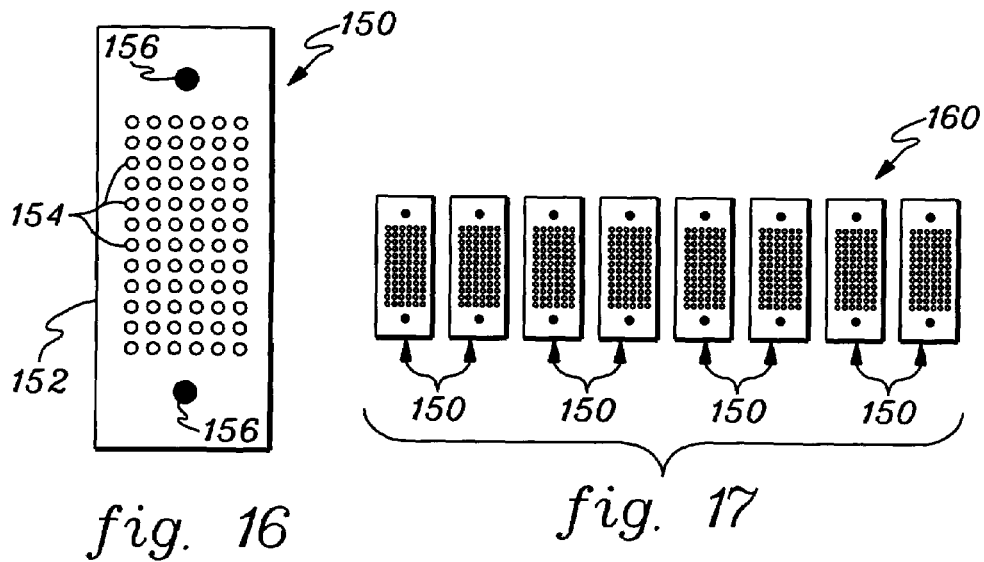
FIG. 16 depicts a front elevation view of one ferrule that may be used with aspects of the present invention.
FIG. 17 depicts an array of ferrules comprising the ferrule shown in FIG. 16.

Channels or wave-guides 130 and 140 may be mounted to device 100 by means of input channel mounting plate 134 and output channel mounting plate 144. Mounting plates 134 and 144 may be any type of structure adapted to retain channels or wave-guides 130 and 140, respectively. For example, mounting plates 134 and 144 may incorporate ferrule connectors. Mounting plates 134 and 144 may be metallic, for example, made of steel, stainless steel, aluminum, or titanium, among other metals; or non-metallic, for example, made from plastic, for example, polyethylene, polypropylene, polyester, polytetraflouroethylene (PTFE), or similar plastics; or ceramic. Mounting plates 134 and 144 typically are similar in size, with width and height between about 5 mm and about 50 mm, for operation at optical wavelengths. Mounting plates 134 and 144 may comprise a plate type "ferrule", as the term is used in the art, for example, an MT-type ferrule or a MultiStar ferrule. As will be discussed below, FIG. 16 illustrates a typical MultiStar-type ferrule that may be used for mounting plates 134 or 144 in one aspect of the invention.

According to one aspect of the invention, when channels 130 and 140 comprise individual optical fibers, mounting plates 134 and 144 may comprise plates or ferrules having a plurality of perforations, for example, a plurality of perforations having diameters between about 125 microns and about 500 microns. According to one aspect of the invention, optical fibers 130 and 140 may be mounted in these perforations, for example, by means of an adhesive or by mechanical means. In one aspect of the invention, optical fibers 130 and 140 include a sleeve, tube, or ferrule mounted on the end, which is inserted into mounting plates 134 and 144. Mounting plates 134 and 144 may comprise ferrule connectors having alignment pins for engaging and aligning the ferules of optical fibers 130 and 140. The sleeve, tube, or ferrule may be rectangular cylindrical or circular cylindrical in shape and have a diameter between about 1 mm and about 3 mm. The ferule may also be circular or rectangular and hold a plurality of optical fibers. For example, a rectangular ferule may be between about 2 mm in width and about 8 mm in width and about 2 mm in length and about 12 mm in length and include at least two perforations, for example, 8, 12, 24, or 74 perforations for holding individual fibers or individual fibers mounted on ferrules.

In the aspect of the invention shown in FIG. 8–15, fiber optical bundles 132 and 142 comprising four individual optical fibers 130 and 140, respectively, are mounted in rectangular ferrules 136 and 146, respectively. Ferrules 136 and 146 may have a width and a height of between about 5 mm and about 50 mm and at least one perforation or through hole having a diameter of between about 125 mm and about 500 mm. Fibers 130 and 140 may be mounted in the perforations by means of an adhesive.

In one aspect of the invention, device 100 includes an input array 112 and output array 114 each comprising 8×8 arrays for receiving bundles of optical fibers with each bundle of optical fibers including 72 individual fibers. Other arrangements for device 100 will be readily apparent to those of skill in the art.

FIG. 16 illustrates one type of ferrule that may fiber optical ferrule 150 that may be used for mounting plates 134 and 144 in device 100 according to one aspect of the present invention. Ferrule 150 may comprise a plate 152 having a plurality of holes 154, for example, a plurality of equally spaced holes 154. Plate 152 may be may be metallic, for example, made of steel, stainless steel, aluminum, or titanium, among other metals; or non-metallic, for example, made from plastic, for example, polyethylene, polypropylene, polyester, polytetraflouroethylene (PTFE), or similar plastics; or ceramic. Plate 152 may have a width of between about 1 mm and about 6 mm, for example, a width of between about 2 mm and about 3 mm, and a length of between about 3 mm and about 12 mm, for example, a width of between about 5 mm and about 6 mm. Holes 154 may have a diameter of between about 125 microns and about 127 microns and be equally spaced both horizontally and vertically at about 0.25 mm on center. In the aspect of the invention shown in FIG. 16, ferrule 150 includes a 6×12 array of equally spaced holes 154. It will be readily apparent to those of skill in the art that other rectangular or square hole arrays may also be used, for example, 3×6, 4×12, 6×6, or 12×12, among many other possible arrangements. Ferrule 150 may also include at least one mounting hole 156, typically, at least two mounting holes 156. Mounting holes 156 may have a diameter of between about 1 mm and about 3 mm and be equally spaced both horizontally and vertically on plate 152. In one aspect of the invention, the centerlines of mounting holes 156 may be vertically spaced from the centerlines of holes 154 by about 0.3 to about 1.0 mm, for example, by about 0.5 to about 0.7 mm. According to one aspect of the invention, at least one optical fiber may be mounted in each of the holes 152, for example, by means of an adhesive. In another aspect of the invention, a plurality of optical fibers is mounted in each hole 152. In one aspect of the invention, ferrule 150 may be a ribbon fiber MT ferrule provided by numerous suppliers, though other types of ferrules may be used.

FIG. 17 illustrates a plan view of one aspect of the present invention in which a plurality of ferrules 150 shown in FIG. 16 are used to provide an array 160 of ferrules 150. In one aspect of the invention, FIG. 17 illustrates a side elevation view of a device similar to device 100 having a plurality of input mounting plates provided by ferrules 150. In one aspect of the invention, ferrules 150 may be equally spaced, for example, equally horizontally or vertically spaced at a pitch of between about 2 and about 8 mm, for instance, between about 3 and about 4 mm. In the aspect of the invention shown in FIG. 17, ferrules 150 are arranged in a 1×8 array. It will be apparent to those of skill in the art, that array 160 may comprise many rectangular or square arrays of ferrules 150, including 1×16, 2×8, 3×12, 4×4, 6×6, or 12×18, among many others.

Figure 18:
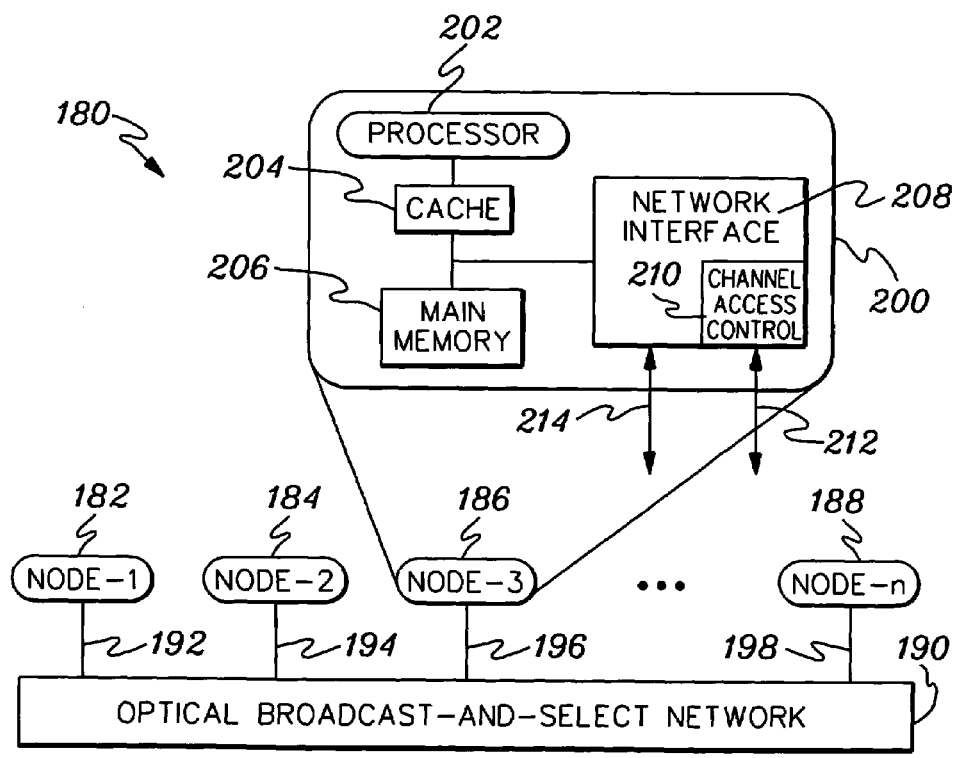
FIG. 18 depicts an optical communication system according to one aspect of the present invention.

FIG. 18 illustrates a typical optical communication system 180 that can be provided according to one aspect of the present invention. According to this aspect of the invention, multiple processing nodes 182, 184, 186, and 188 in system 180 may be connected via an optical bus network 190 to create an optical bus architecture, for example, an optical symmetric multi-processor (SMP) bus architecture. According to the present invention, optical bus network 190 may include one or more optical coupling devices 100 shown in and described with respect to FIGS. 8–15, for example, an N×N optical coupler having K optical channels. As shown in FIG. 18, nodes 182, 184, 186, and 188 may comprise any number of "n" nodes, where n is a positive integer. Nodes 182, 184, 186, and 188 may communicate optically with bus network 190 via optical channels 192, 194, 196, and 198, respectively. Nodes 182, 184, 186, and 188 may comprise individual processors, for example, individual computers or personal computers, or may comprise individual subsystems. As shown in FIG. 18, in one aspect of the invention, nodes 182, 184, 186, and 188 may comprise a subsystem 200 having multiple components, for example, one or more processors 202, one or more caches 204, or one or more memory devices 206, which interface with network 190 via network interface 208. According to one aspect of the invention, network interface 208 may communicate, for example, optically, with network 190 via channel access controller 210, for example, network interface 208 may optically communicate one or more network control signals to and from network 190 as indicated by double arrow 212. In another aspect of the invention, network interface 208 may communicate directly with network 190, for example, communicate one or more data signals to and from network 190 as indicated by double arrow 214.

Aspects of the present invention provide an optical star coupler constructed in an integrated package that utilizes free-space optical propagation and diffractive optical elements (DOEs) within the package to provide multiple optical star couplers, for example, K independent and parallel N×N star couplers (where N and K are integers greater than zero). One aspect of the invention provides a device that simultaneously connects each of the fibers in N input fiber bundles to their corresponding fibers in all N output fiber bundles, with each fiber bundle having K fibers. According to one aspect of the invention, a device is provided wherein each of the K fibers in each of the N input bundles is connected to its corresponding fiber on all of the N output fiber bundles, thus creating an integrated structure of K star couplers, each operating as an N×N star coupler, working in parallel.

Aspects of the present invention overcome the limitations of the prior art by utilizing DOEs to perform both efficient coupling and equal power distribution between any input and all corresponding outputs. Furthermore, aspects of the present invention outperform prior art implementations in their degree of scalability by operating on K fibers simultaneously. According to one aspect of the invention, where the prior art is concerned with performing coupling only between single-fiber inputs and single-fiber outputs, aspects of the present invention provides coupling between fiber bundles, where the fiber bundles are comprised of multiple singular fibers. According to another aspect of the invention, the scalability of the coupling is also increased compared to the prior art. For example, where the prior art strictly provides one-dimension (that is, "1D") star couplers in which coupling is within a single plane, aspects of the present invention provide DOEs to create a two-dimensional (that is, "2D") star coupler. For example, in one aspect of the invention, multiple 1D N×N star couplers with N inputs and N outputs can provide a 2D N×N star coupler with K×N inputs and outputs. According to this aspect of the invention, the inherent increase in coupling density makes this aspect of the invention especially advantageous in scalable optical networks, such as when used for an optical bus. In addition, in one aspect of the invention, the coupling density can be scaled by increasing the fiber bundle size or making multiple 2D N×N star couplers within the same package. The prior art cannot accomplish this coupling density or provide the advantages of this coupling density.

Though aspects of the invention were described above with respect to optical communications systems, it will be apparent to those of skill in the art that aspects of the present invention may be applicable to any type of system in which electromagnetic radiation is coupled or distributed from among one or more optical drivers to one or more optical receivers. For example, aspects of the present invention may be used to couple devices by means of visible light, infrared light, microwaves, radio waves, x-rays, and gamma rays. In one aspect of the invention, the electromagnetic radiation handled by aspects of the present invention may be any form of electromagnetic radiation having a wavelength that can be used as a medium for transferring information, for example, data.

Among other things, aspects of the present invention overcome many of the disadvantages of the prior art. For example, aspects of the present invention provide efficient coupling of the input and output waveguides; aspects of the present invention provide efficient and uniform power distribution from the input to the output waveguides; aspects of the present invention provide are also scalable to provide larger scale or more complex optical coupling applications; and aspects of the present invention provide devices providing two and three dimensional coupling. These advantages of aspects of the present invention cannot be provided by the prior art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A multi-point busing device adapted for multi-point busing of a plurality of optical signals to a plurality of optical receivers, the device comprising:
   a plurality of first diffractive optical elements mounted to a first substrate, each of the plurality of first diffractive optical elements adapted to receive at least one of the plurality of optical signals and split the at least one of the plurality of optical signals into a plurality of split optical signals having substantially the same wavelength; and
   a plurality of second diffractive optical elements mounted to a second substrate, each of the plurality of second diffractive optical elements adapted to receive and combine at least some of the plurality of split optical signals and direct at least some of the combined optical signals toward at least one of the plurality of optical receivers.

2. The device as recited in claim 1, wherein the plurality of first diffractive optical elements and the plurality of second diffractive optical elements comprise computer-generated micro-optical devices.

3. The device as recited in claim 1, wherein the plurality of first diffractive optical elements and the plurality of second diffractive optical elements comprise one or more of a binary optic, a kinoform optic, a computer-generated holographic optic, and a diffraction grating.

4. The device as recited in claim 1, wherein the plurality of first diffractive optical elements and the plurality of second diffractive optical elements are produced by one of lithography and molding.

5. The device as recited in claim 4, wherein the plurality of first diffractive optical elements and the plurality of second diffractive optical elements are produced by means of one of microlithography and nanolithography.

6. The device as recited in claim 1, wherein the plurality of first diffractive optical elements are adapted to split a beam of electromagnetic radiation into a plurality of beams of electromagnetic radiation having substantially equal intensity.

7. The device as recited in claim 1, wherein the first substrate and the second substrate are substantially optically transparent.

8. The device as recited in claim 1, wherein the first substrate lies in a first plane and the second substrate lies in a second plane, different from the first plane.

9. The device as recited in claim 8, wherein the first plane and the second plane are oblique.

10. The device as recited in claim 1, further comprising a housing enclosing the first substrate and second substrate.

11. The device as recited in claim 1, further comprising a coupling region through which the split optical signal may pass with little or no distortion or attenuation.

12. The device as recited in claim 1, wherein the plurality of first diffractive optical elements comprise an N1×N2 array, where N1 and N2 are positive integers.

13. The device as recited in claim 1, wherein at least one of the first substrate and the second substrate comprises a plurality of substrates.

14. The device as recited in claim 1, wherein the plurality of optical signals comprise one of laser light, visible light, microwaves, radio waves, and x-rays.

15. The device as recited in claim 1, wherein the plurality of optical signals are provided by one of a plurality diffractive optical elements and a plurality of lasers.

16. The device as recited in claim 1, wherein the plurality of optical receivers comprises at least one of a diffractive optical element and a photodetector.

17. The device as recited in claim 1, further comprising:
a plurality of first optical fibers adapted to direct at least some of the plurality of optical signals to at least some of the plurality of first diffractive optical elements, and
a plurality of second optical fibers adapted to direct at least some of the combined split optical signals to at least some of the plurality of optical receivers.

18. The device as recited in claim 17, wherein at least one of the first plurality of optical fibers and the second plurality of optical fibers comprises multi-mode fibers.

19. The device as recited in claim 18, wherein the first plurality of optical fibers comprises single-mode fibers and the second plurality of optical fibers comprises multi-mode fibers.

20. The device as recited in claim 1, wherein the plurality of first diffractive optical elements comprises three or more diffractive optical elements and the plurality of second diffractive optical elements comprise three or more diffractive optical elements.

21. A communication system comprising the device recited in claim 1 and a plurality of processing nodes, wherein the plurality of optical signals are provided by the plurality of processing nodes.

22. The multi-point busing device recited in claim 1, wherein the plurality of first diffractive optical elements comprise an N1×N2 array and the plurality of second diffractive optical elements comprise an M1×M2 array, where N1, N2, M1 and M2 are positive integers.

23. The multi-point busing device recited in claim 22, wherein each of first optical element in the N1×N2 array is simultaneously coupled to each second optical element in the M1×M2 array.

24. The multi-point busing device recited in claim 1, wherein each of the plurality of second diffractive optical elements are adapted to simultaneously receive and combine at least some of the plurality of split optical signals and simultaneously direct at least some of the combined optical signals.

25. A method of multi-point busing a plurality of input optical signals from a plurality of optical signal drivers to a plurality of optical receivers, the method comprising:
splitting at least some of the plurality of input optical signals using a plurality of first diffractive optical element to produce a plurality of split optical signals having substantially the same wavelength;
directing the split optical signals using the plurality of first diffractive optical elements to a plurality of second diffractive optical elements;
receiving and combining at least some of the split optical signals using the plurality of second diffractive optical elements; and
directing at least some of the combined split optical signals to the plurality of optical receivers using the second diffractive optical elements.

26. The device as recited in claim 25, wherein the plurality of first diffractive optical elements and the plurality of second diffractive optical elements comprise computer-generated micro-optical devices.

27. The method as recited in claim 25, wherein the optical signals comprise one of laser light, visible light, microwaves, radio waves, and x-rays.

28. The method as recited in claim 25, further comprising collimating at least some of the plurality of input optical signals.

29. The method as recited in claim 25, further comprising transmitting the plurality of input optical signals from the plurality of optical signal drivers through a plurality of optical waveguides.

30. The method as recited in claim 29, wherein the plurality of optical waveguides comprises a plurality of bundled optical fibers.

31. The method as recited in claim 30, wherein transmitting the plurality of input optical signals through the plurality of bundled optical fibers comprises multi-mode transmission.

32. The method as recited in claim 25, further comprising transmitting at least some of the combined split optical signals directed by the second diffractive optical elements through a plurality of optical waveguides.

33. The method as recited in claim 32, wherein the plurality of optical waveguides comprises a plurality of bundled optical fibers.

34. The method as recited in claim 33, wherein transmitting at least some of the combined split optical signals through the plurality of bundled optical fibers comprises multi-mode transmission.

35. The method as recited in claim 25, further comprising transmitting the plurality of input optical signals through a plurality of optical fibers by single-mode transmission, and further comprising transmitting at least some of the combined split optical signals through a plurality of optical fibers by multi-mode transmission.

36. The method as recited in claim 25, wherein receiving and combining comprises simultaneously receiving and combining.

* * * * *